United States Patent
Dastidar et al.

(10) Patent No.: US 11,947,459 B2
(45) Date of Patent: Apr. 2, 2024

(54) MULTIPATH MEMORY WITH STATIC OR DYNAMIC MAPPING TO COHERENT OR MMIO SPACE

(71) Applicant: XILINX, INC., San Jose, CA (US)

(72) Inventors: Jaideep Dastidar, San Jose, CA (US); James Murray, Los Gatos, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/449,561

(22) Filed: Sep. 30, 2021

(65) Prior Publication Data

US 2023/0094621 A1 Mar. 30, 2023

(51) Int. Cl.
*G06F 12/0817* (2016.01)
(52) U.S. Cl.
CPC .... *G06F 12/0828* (2013.01); *G06F 2212/621* (2013.01)
(58) Field of Classification Search
CPC .............. G06F 12/0828; G06F 2212/621
USPC ................................................ 711/118
See application file for complete search history.

(56) References Cited

U.S. PATENT DOCUMENTS

| | | | |
|---|---|---|---|
| 10,402,326 B1 * | 9/2019 | Hall | G06F 12/0815 |
| 10,698,842 B1 | 6/2020 | Dastidar et al. | |
| 2016/0378701 A1 * | 12/2016 | Niell | G06F 12/0831 710/308 |
| 2020/0327089 A1 * | 10/2020 | Dastidar | G06F 13/4221 |
| 2020/0341941 A1 | 10/2020 | Dastidar et al. | |
| 2021/0149680 A1 * | 5/2021 | Hughes | G06T 1/60 |
| 2021/0311900 A1 * | 10/2021 | Malladi | G06F 13/1663 |
| 2022/0382679 A1 * | 12/2022 | Jalal | G06F 12/084 |

\* cited by examiner

*Primary Examiner* — Gautam Sain
*Assistant Examiner* — Wei Ma
(74) *Attorney, Agent, or Firm* — Patterson + Sheridan, LLP (57) ABSTRACT

Embodiments herein describe memories in a processor system in an integrated circuit (IC) that can be assigned to either a cache coherent domain or an I/O domain, rather than being statically assigned by a designer of the IC. That is, the user or customer can assign the memories to domain that best suits their desires. Further, the memories can be reassigned to a different domain if the user later changes her mind.

20 Claims, 6 Drawing Sheets

MULTIPATH MEMORY WITH STATIC OR DYNAMIC MAPPING TO COHERENT OR MMIO SPACE

TECHNICAL FIELD

Examples of the present disclosure generally relate to memories in a processor system that can be assigned into either a coherent domain or an input/output (I/O) domain.

BACKGROUND

A processor system attached to the main memory (or normal memory) path typically offers the advantages of having hardware cache coherency that maintains the correct updated copies of memory, or coherent shared copies of memory across multiple processors and caches. A memory in the processor system that is attached to the device memory or memory-mapped I/O (MMIO) path offers the advantages of having the hardware interconnect maintain the strict read and write ordering expected for transactions from the source processor to a destination memory, where the transactions are generated by the device driver running on the processor interacting with the processor system. Normal or main memory, on the other hand, typically uses lock mechanisms or cache-coherent synchronization barrier mechanisms which allow for operations to be unordered up until the synchronization barrier.

The designer of the processor system makes a decision at implementation time to statically attach memories either to the main memory path part of a cache coherent domain or the MMIO path part of an I/O domain. An operating system (OS) utilizes the memory, or creates the page table attributes of that memory, in a static manner—either as part of the I/O domain or the cache coherent domain (also referred to as the main memory domain). The decision to select one path or the other may also be a limitation of the multi-processor interconnect requiring an apriori assignment for the memories in the processor system at implementation time. Thus, once assigned by the designer, the memories in the processor system cannot be reassigned to a different domain. As a result, the user or customer of the processor system cannot change the initial assignment made by the designer.

SUMMARY

Techniques for supporting assignable and non-assignable memories in a processing system are described. One example is processor system in an integrated circuit (IC) that includes an interconnect comprising a cache coherent path and an input/output (I/O) path, a processor core connected to the interconnect, a switch connected to the cache coherent path and the I/O path, and assignable memories configured to be assigned to one of a cache coherent domain shared with the processor core or an I/O domain which is non-cache coherent with the processor core. Moreover, the switch routes data between the assignable memories and the cache coherent and I/O paths depending on an assignment to the cache coherent and I/O domains.

One example described herein is an IC that includes a processor system and a network on a chip (NoC) coupled to the processor system, and a data processing engine array coupled to the NoC. The processor system further includes an interconnect comprising a cache coherent path and an input/output (I/O) path, a processor core connected to the interconnect, a switch connected to the cache coherent path and the I/O path, and assignable memories configured to be assigned to one of a cache coherent domain or an I/O domain.

One example described herein is a method that includes assigning memories in a processor system to one of a cache coherent domain or an I/O domain, configuring a switch based on the assignment where the switch is communicatively coupled between the memories and an interconnect, configuring the interconnect based on the assignment where the interconnect is communicatively coupled between the switch and a processor core that is in the cache coherent domain, and informing an operating system in the processor core of the assignment.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe memories in a processor system of an integrated circuit (IC) that can be assigned to either a cache coherent domain or an I/O domain, rather than being statically assigned by the designer of the IC. That is, the user or customer can assign the memories to the domain that best suits their needs. Further, the memories can be reassigned to a different domain if the user later changes her mind. As such, the embodiments herein provide greater flexibility in the processor system than previous processor systems where the assignments are fixed (e.g., burned into silicon) and cannot be changed.

In addition to having assignable memories (e.g., memories that can be assigned to either domain), the processor system can include non-assignable memories that are set in a particular domain and are not user-assignable. That is, the processor system can support both assignable and non-assignable memories.

Figure 1:
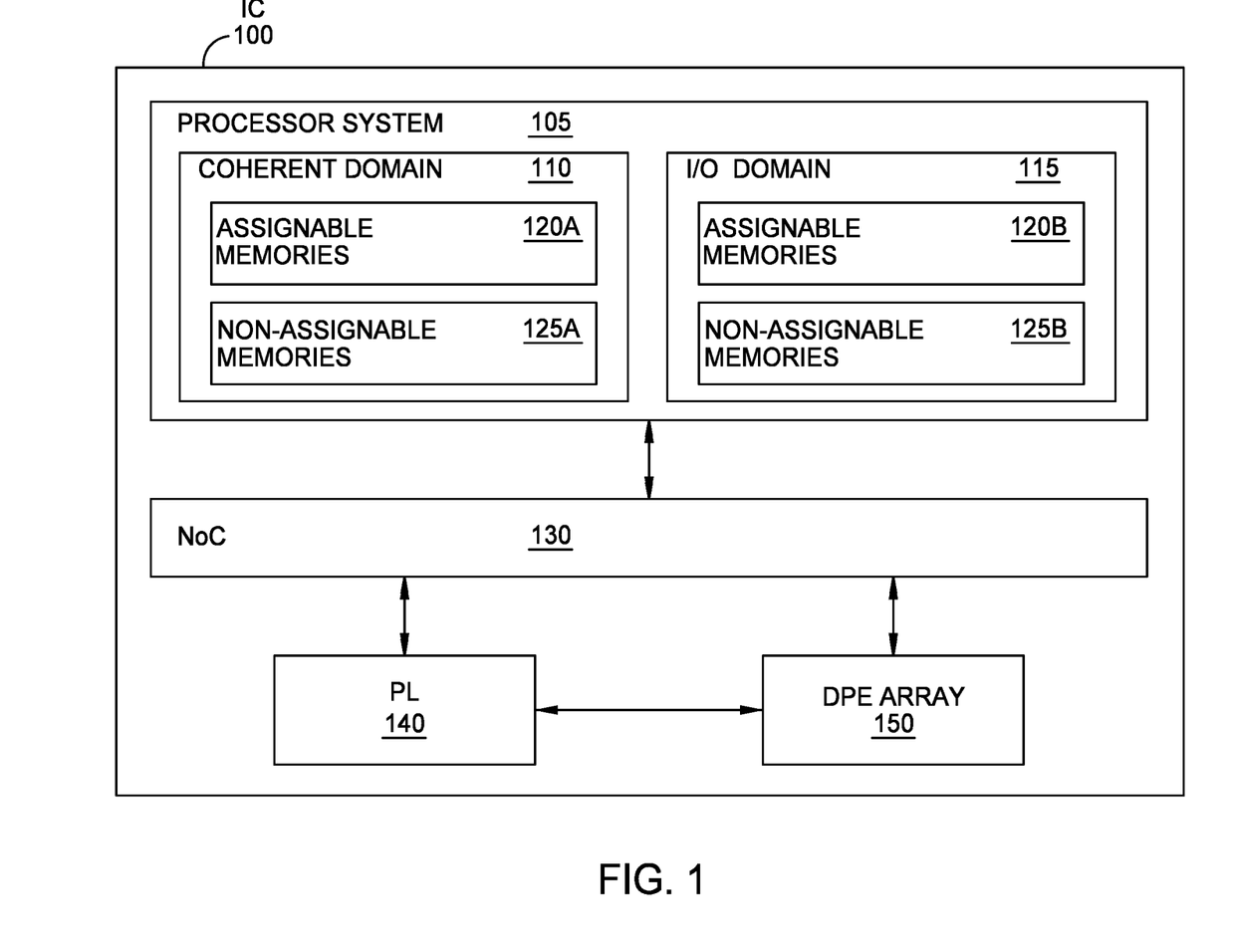
FIG. 1 is a block diagram of an integrated circuit that includes memories in a processor system that can be assigned into different domains, according to an example.

FIG. 1 is a block diagram of an IC 100 that includes a data processing engine (DPE) array 150, according to an example. The DPE array 150 includes a plurality of DPEs which may be arranged in a grid, cluster, or checkerboard pattern in the IC 100. For example, the DPEs can form a 2D array with rows and columns. Further, the array 150 can be any size and have any number of rows and columns formed by the DPEs.

In one embodiment, the DPEs in the array 150 are identical. That is, each of the DPEs (also referred to as tiles or blocks) may have the same hardware components or circuitry. Further, the embodiments herein are not limited to DPEs. The IC 100 can include an array of any kind of processing elements, for example, the DPEs could be digital signal processing engines, cryptographic engines, Forward Error Correction (FEC) engines, or other specialized hardware for performing one or more specialized tasks.

In one embodiment, the array 150 includes DPEs that are all the same type (e.g., a homogeneous array). However, in another embodiment, the array 150 may include different types of engines. For example, the array 150 may include digital signal processing engines, cryptographic engines, graphic processing engines, and the like. Regardless if the array 150 is homogenous or heterogeneous, the DPEs can include direct connections between DPEs which permit the DPEs to transfer data directly as described in more detail below. Further, while the IC 100 includes the DPE array 150, the IC 100 may have other arrays, where the processing elements in the arrays can be different.

In one embodiment, the DPEs are formed from non-programmablelogic—i.e., are hardened. One advantage of doing so is that the DPEs may take up less space in the IC 100 relative to using programmable logic to form the hardware elements in the array 150. That is, using hardened or non-programmable logic circuitry to form the hardware elements in the DPEs such as program memories, an instruction fetch/decode unit, fixed-point vector units, floating-point vector units, arithmetic logic units (ALUs), multiply accumulators (MAC), and the like can significantly reduce the footprint of the array 150 in the IC 100. Although the DPEs may be hardened, this does not mean the DPEs are not programmable. That is, the DPEs can be configured when the IC 100 is powered on or rebooted to perform different functions or tasks.

In this example, the IC 100 includes a network on chip (NoC) 130 that is communicatively coupled to the array 150. Although not shown, the NoC 130 may extend throughout the IC 100 to permit the various components in the IC 100 to communicate with each other. For example, in one physical implementation, the DPE array 150 may be disposed in a lower right portion of the IC 100. However, using the NoC 130, the array 150 can nonetheless communicate with, for example, programmable logic (PL) 140, a processor system (PS) 105, or input/output (I/O) circuits which may be disposed at different locations throughout the IC 100.

Although FIG. 1 illustrates one block of PL 140, the IC 100 may include multiple blocks of PL 140 (also referred to as configuration logic blocks (CLB)) that can be disposed at different locations in the IC 100. For example, the IC 100 may include hardware elements that form a FPGA. However, in other embodiments, the IC 100 may not include any PL 140—e.g., the IC 100 is an application specific integrated circuit (ASIC). Further, because the IC 100 has a heterogeneous processing environment that includes PL 140, the DPE array 150, and the processor system 105, it can also be referred to as a system on a chip (SoC).

The processor system 105 (which can also be a processor subsystem) includes a cache coherent domain 110 and a I/O domain 115 which can be associated with one or more processing cores (not shown) in the processor system 105. In one embodiment, the cache coherent domain 110 uses a hardware cache-coherent shared-memory multiprocessor (or multicore) paradigm with a generic, instruction set architecture (ISA)-independent, model of interfacing in the execution tasks or functions on multiprocessor CPUs or cores in the processor system 105. The I/O domain 115, in contrast, relies on MMIO to transfer data between the cores (e.g., CPUs) in the processor system 105 and the memories assigned to this domain.

In this embodiment, both the cache coherent domain 110 and the I/O domain 115 include assignable memories 120 and non-assignable memories 125. The assignable memories 120 are memories that can be assigned (and reassigned) to either the cache coherent domain 110 or the I/O domain 115. For example, the user or customer may have previously selected a first portion of the assignable memories 120A to be in the cache coherent domain 110 (and thus, be cache coherent with the processor cores in the processor system 105) while selecting a second portion of the assignable memories 120B to be in the I/O domain 115 (and thus, are not cache coherent with the cores in the processor system 105). As described below, the user can change this assignment such that one of the assignable memories 120A in the cache coherent domain 110 can be reassigned into the I/O domain 115, and vice versa.

The non-assignable memories 125, in contrast, are not user assignable. In one embodiment, these memories 125 are assigned into one of the domains by the designer and this assignment cannot be changed by the user. While FIG. 1 illustrates a processor system 105 that includes both types of memories, in one embodiment, the processor system 105 can include only assignable memories 120, which can be dynamically assigned to different domains.

Further, flexible resources such as programmable logic memory, which can offer a flexible programming model and size, either as part of the cache coherent domain 110 or the I/O domain 115 no longer have to be fixed/declared as one type of resource in the device tree.

As discussed in more detail below, the assignable memories 120 in components in the processor system such as PL memory, on-chip memory, or accelerators can be partially or fully mapped to either the cache coherent domain 110 or the I/O domain 115. Thus, the same hardware implementation can be capable of a flexible range of choices for those components and all that has to change is the device tree software binaries, which advertise the preferred mapping for the assignable memories 120. Depending on the application space that the implementation is targeted at, the device tree can advertise components or the subset of components mapped to cache coherent domain 110 which benefit from following the multi-processor cache coherent memory paradigm, where the component's assignable memory 120 or data structures can be easily shared across, cached across, or migrated across multiple processor cores in the processor system 105. At the same time, the subset of components mapped to the I/O domain 115 can follow the I/O device driver memory paradigm, where the component's assignable memory 120 or data structures can leverage existing or simpler I/O device driver semantics where sharing of the components' resources between processor cores is handled by a device driver.

By having assignable memories 120, the decision as to whether a new component in the processor system 105 is represented in the device tree as accessible along the main memory path (e.g., is part of the cache coherent domain 110) or the MMIO path (e.g., is part of the I/O domain 115) does not have to be made up front for an implementation. Instead, the embodiments herein allow for the determination of the deployment model for the assignable memories 120 in the component to be made later. By having the hardware be capable of selecting both paths, performance data can be evaluated, or a use-case analysis can be done, so that the best path is selected at a later date, and advertised to the OS via the appropriate device tree software binaries for that deployment model.

Further, flexible components such as PL memory can be assigned to either the cache coherent domain 110 or the I/O domain 115 resulting in a more efficient usage of PL resources. Also, the same hardware implementation can support a variety of use-cases by varying the device tree and its companion bitstream if necessary.

Figure 2:
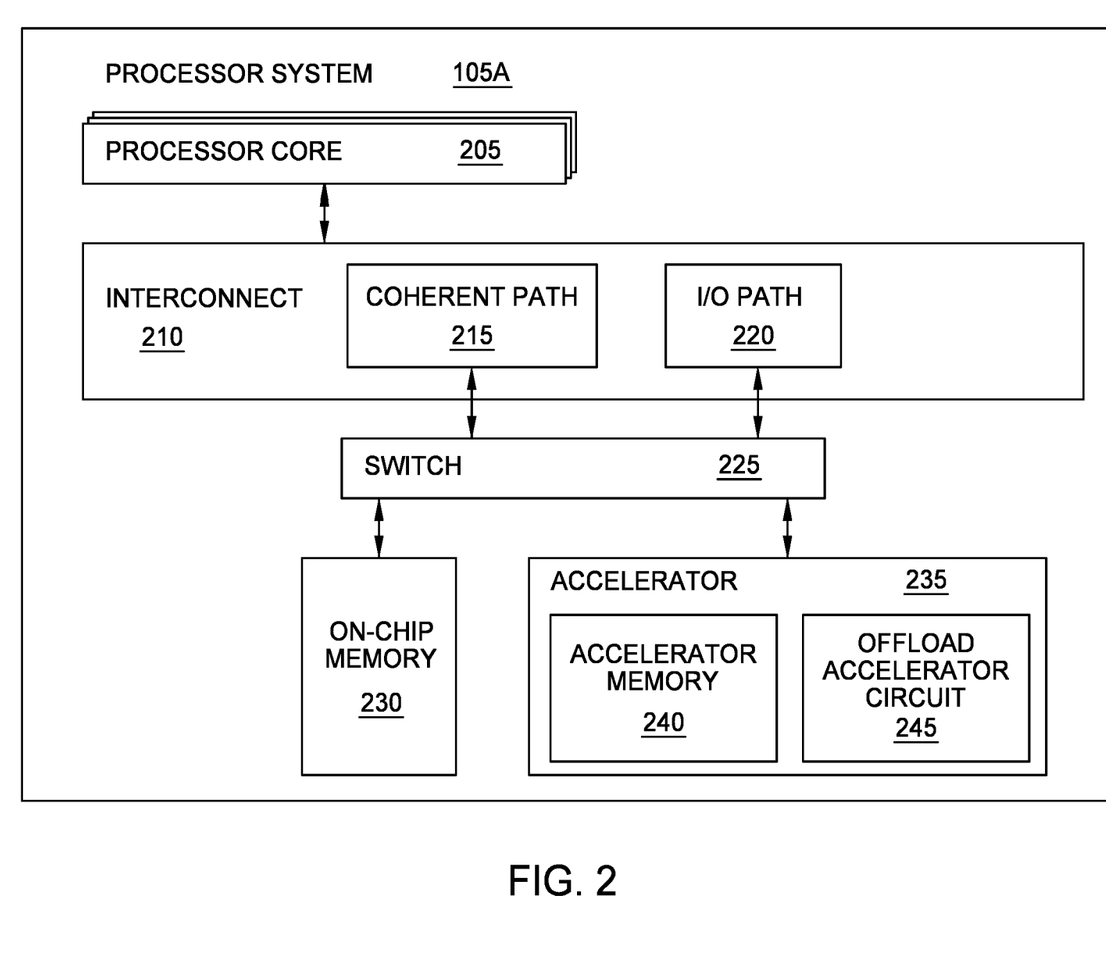
FIGS. 2 and 3 are block diagrams of processor systems with memories that can be assigned into different domains, according to examples.

FIG. 2 is a block diagram of a processor system 105A with memories that can be assigned into different domains, according to examples. FIG. 2 illustrates one implementation of the processor system 105 in FIG. 1, which can include assignable and non-assignable memories. As shown, the processor system 105A includes one or more processor cores 205 (e.g., central processing units (CPUs)). Although not shown, each processor core 205 can include an embedded OS (e.g., software) that performs tasks for different hardware components in the IC.

To perform these tasks, the processor cores 205 are attached to an interconnect 210 (e.g., a coherent mesh network (CMN)) that is in turn coupled to a switch 225 (e.g., switching circuitry). The interconnect 210 includes a cache coherent path 215 (e.g., a normal or main memory path) and an I/O path 220 (e.g., a MMIO path). When transmitting data to a component that shares the same cache coherent domain as the processor cores 205, the data is transmitted along the cache coherent path 215. However, when communicating with a component that is not part of the cache coherent domain as the processor cores 205 (i.e., is part of the I/O domain 115 in FIG. 1), the data uses the I/O path 220.

Both the cache coherent path 215 and the I/O path 220 are coupled to the switch 225 which is in turn coupled to various components—i.e., an on-chip memory 230 and an accelerator 235. These components are either memory themselves (as is the case of the on-chip memory 230) or include tightly coupled memory (as is the case of accelerator memory 240 in the accelerator 235). Thus, the embodiments herein can apply to any component in the processor system 105 that includes memory that is communicatively coupled to the processor cores 205.

FIG. 2 assumes that the on-chip memory 230 and the accelerator memory 240 are assignable memories. Thus, the memories 230, 240 can both be assigned to the same domain (e.g., both assigned to the cache coherent domain), or one can be assigned to the cache coherent domain while the other is assigned to the I/O domain. Further, these assignments can be changed later down the road if desired.

Depending on which domain the memories 230, 240 are assigned determines which path in the interconnect 210 these memories 230, 240 use when sharing data with the processor cores 205. If both memories 230, 240 are assigned to the I/O domain, then the processor cores 205 and the memories 230, 240 use the I/O path 220 to transmit data through the interconnect 210. If the on-chip memory 230 is assigned to the cache coherent domain but the accelerator 235 and its memory 240 are assigned to the I/O domain, then the on-chip memory 230 uses the cache coherent path 215 while the accelerator memory 240 uses the I/O path 220. If these assignments are changed, the interconnect 210 can be reconfigured to ensure the data is routed on the proper path.

The switch 225 is coupled to both the cache coherent path 215 and the I/O path 220. While this is shown as a direct connection, there may be intermediate circuitry between the interconnect 210 and the switch 225 (e.g., the circuitry discussed in FIG. 5). The switch 225 can receive data from the components and determine which path should receive that data. For example, if the on-chip memory 230 is assigned to the cache coherent domain, the switch 225 routes any data received from this memory 230 to the cache coherent path 215. If the accelerator 235 is assigned to the I/O domain, the switch 225 routes any data received from the accelerator memory 240 to the I/O path 220. If one of these assignments changes, then the switch 225 is reconfigured so that the data received from the corresponding memory is now routed on the other path in the interconnect 210. In this manner, the switch 225 provides a flexible hardware routing circuit that can permit the components to be reassigned to different domains and switch to using different paths in the interconnect 210.

Although not shown here, the switch 225 can also be connected to components in the processor system 105A that have non-assignable memories. In this case, the switch 225 cannot be updated to route data received from these memories to different paths. That is, the switch 225 always routes the data received from non-assignable memories to the same path in the interconnect 210. Connecting the switch 225 to non-assignable memories is discussed in more detail in FIG. 6 below.

The processor cores 205 may use an offload accelerator circuit 245 in the accelerator 235 to perform a specialized task such as data compression/decompression or data encryption/decryption. For example, the IC containing the processor system 105A may be an accelerator (such as a machine learning accelerator, data compression accelerator, graphics processing accelerator, data encryption accelerator, and the like). These accelerator tasks may be performed primarily by the DPE array 150 or PL 140 in FIG. 1. However, the processor system 105 has its own accelerator 235, which can be thought of as an accelerator within an accelerator (e.g., the IC 100).

In one embodiment, the processor system 105 does not include the accelerator 235 but can include multiple on-chip memories 230 or other types of components with memories that can be independently assigned to the cache coherent or I/O domains.

Further, while the entire memories 230, 240 can be assigned to one domain, in other embodiments, the physical memories 230, 240 can be logically divided into separate memories, where those memories can be independently assigned to either the cache coherent or I/O domain. For example, the first half of the memory addresses in the on-chip memory 230 can be assigned to the cache coherent domain (and use the cache coherent path 215 to communicate with the processor cores 205) while the second half of the memory addresses in the memory 230 are assigned to the I/O domain and use the I/O path 220 to communicate with the processor cores 205. Thus, the assignment of the memories to the domains can be performed at a physical level where the entire physical memory is assigned to one domain or the other, or at a logical level where portions of a physical memory can be logically divided and assigned to different domains.

Figure 3:
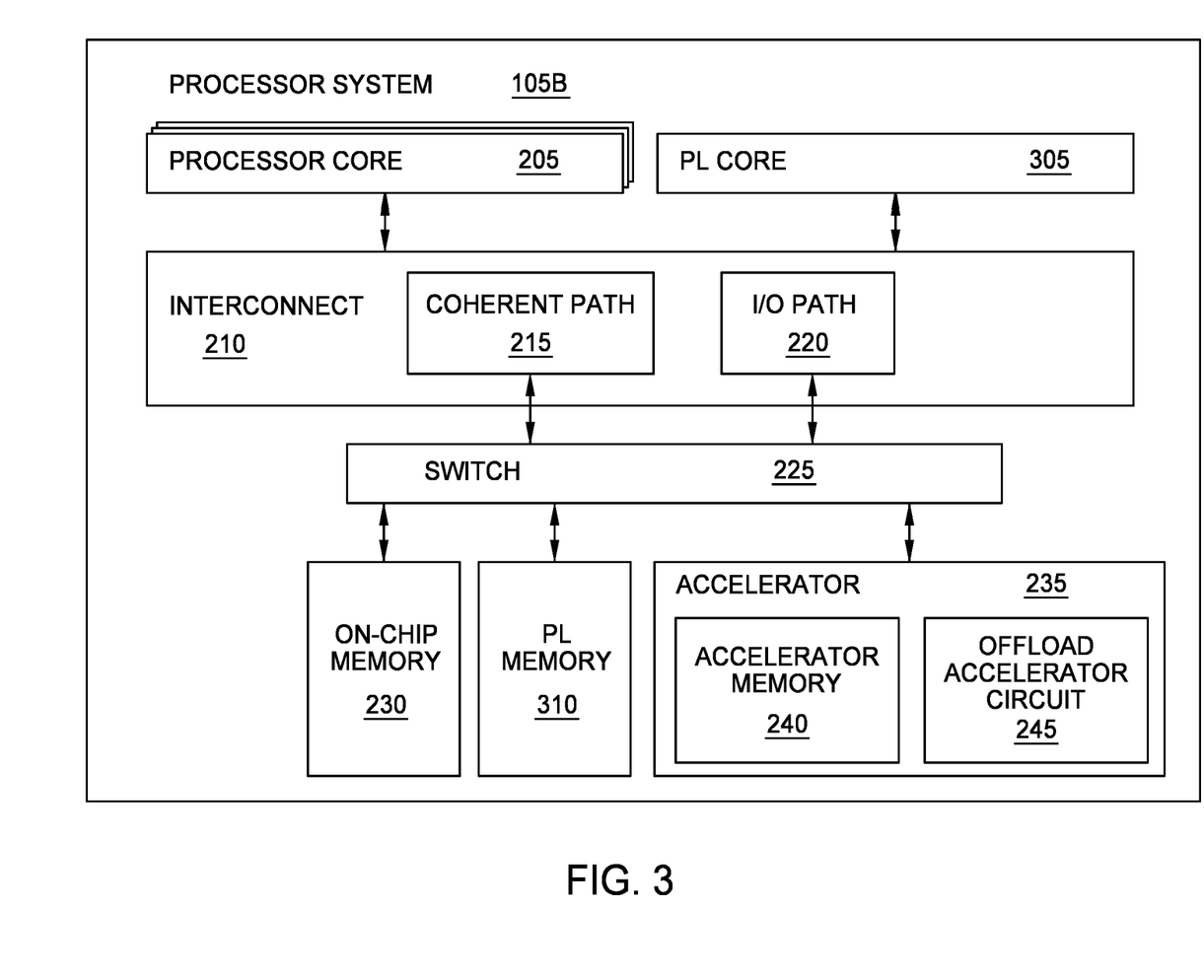

FIG. 3 is a block diagram of a processor system 105B with memories that can be assigned into different domains, according to examples. The processor system 105B is the same as the processor system 105A in FIG. 2 except the system 105B includes a PL core 305 and PL memory 310. For example, the processor system 105B may be implemented in an IC that contains PL while the processor system 105A in FIG. 2 may be implemented in an IC that does not have PL.

The PL core 305 (also referred to as a programmable core) can be reconfigured to perform different user-applications or functions, while the processor cores 205 perform a fixed function. Further, the PL core 305 and the processor cores 205 can be part of the same cache coherent domain.

The PL memory 310 can be memory in PL logic blocks within the processor system 105. The PL memory 310 may be separate from the PL 140 shown in FIG. 1 that is external to the processor system 105B. That is, the IC can include PL in the processor system 105 (e.g., the PL core 305 and the PL memory 310), as well as PL 140 elsewhere in the IC.

Like the on-chip memory 230 and the accelerator memory 240, FIG. 3 assumes the PL memory 310 is independently assignable to either the cache coherent domain (which is shared with the cores 205, 305) or the I/O domain. Depending on its assignment, the switch 225 routes the data received from the PL memory 310 to either the cache coherent path 215 or the I/O path 220 in the interconnect 210. Further, this assignment can be changed at a later time, if desired by the user, in which case the switch 225 and the interconnect 210 are reconfigured so that the PL memory 310 switches to using the other path to communicate with the cores 205, 305.

Further, the embodiments herein are not limited to the specific components (e.g., the on-chip memory 230, the accelerator 235, and the PL memory 310) illustrated in FIGS. 2 and 3. Generally, the embodiments herein can support assignable memory, regardless of the particular type of component in the processor system that includes the memory.

Figure 4:
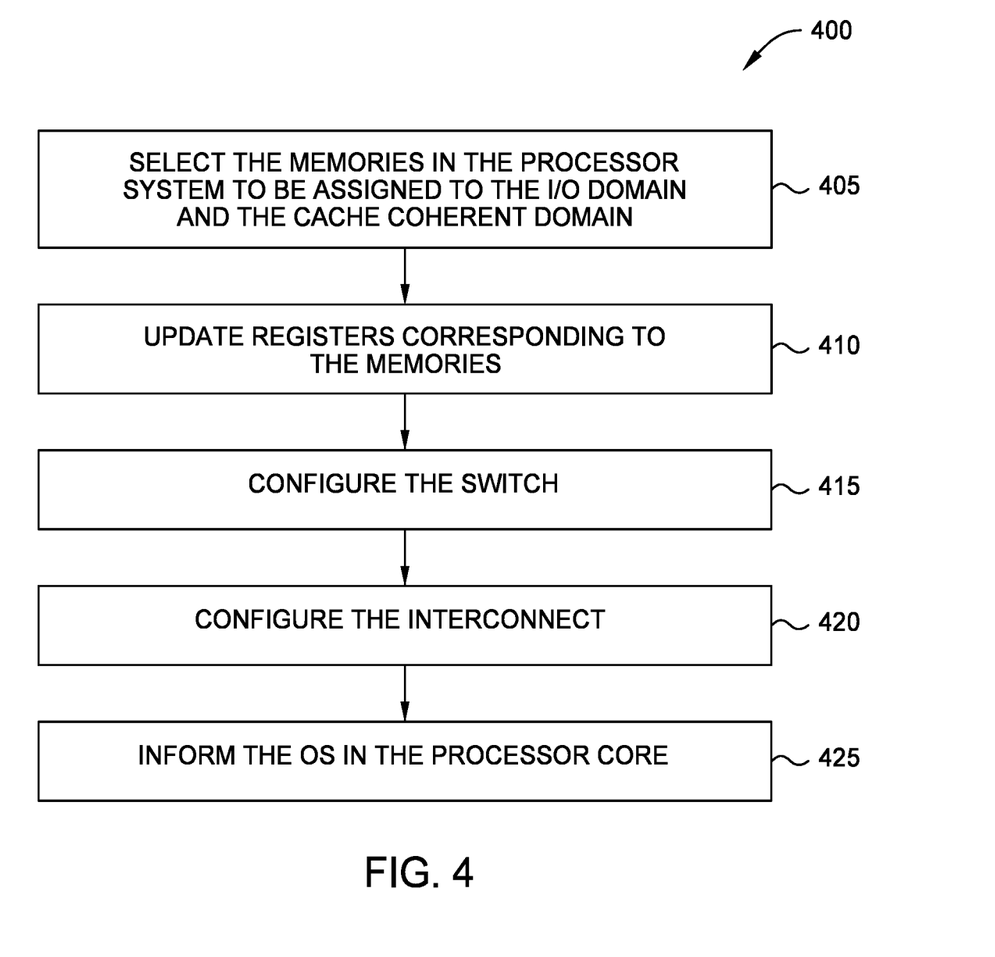
FIG. 4 is a flowchart for assigning a memory to either the I/O or the cache coherent domain, according to an example.

FIG. 4 is a flowchart of a method 400 for assigning a memory to either the I/O or the cache coherent domain, according to an example. At block 405, the user selects the memories in the processor system to be assigned to the I/O domain and the cache coherent domain. In one embodiment, firmware in the processor system receives the user selection using an application programming interface (API) or other types of user-accessible menu (e.g., a graphical user interface (GUI)) that permits the user to provide (or update) an assignment corresponding to an assignable memory in the IC.

At block 410, the firmware in the processor system updates registers corresponding to the memories. In one embodiment, each assignable memory (which can be the physical memory or a logical partition of that memory) is assigned its own register so that the memory can be independently assigned to the cache coherent domain or the I/O domain.

Using the components in FIG. 3 as an example, the value of a register for the on-chip memory 230 may use one value (e.g., a zero) to indicate a non-cache coherent mode (i.e., the memory 230 is assigned to the I/O domain) where the distribution of traffic for addresses to the memory 230 is disabled and a second value (e.g., a one) to indicate a cache coherent model (i.e., the memory 230 is assigned to the cache coherent domain) where the distribution of traffic for addresses to the memory 230 is enabled.

The value of a register for the PL memory 310 may use one value (e.g., a zero) to indicate a non-cache coherent mode (i.e., the memory 310 is assigned to the I/O domain) where the distribution of traffic for addresses to the memory 310 is disabled and a second value (e.g., a one) to indicate a cache coherent model (i.e., the memory 310 is assigned to the cache coherent domain) where the distribution of traffic for addresses to the memory 310 is enabled.

For the accelerator 235, the value of a register may use one value (e.g., a zero) to indicate a non-cache coherent mode (i.e., the accelerator memory 240 is assigned to the I/O domain) where the distribution of traffic for addresses to the accelerator memory 240 is disabled and a second value (e.g., a one) to indicate a cache coherent model (i.e., the accelerator memory 240 is assigned to the cache coherent domain) where the distribution of traffic for addresses to the accelerator memory 240 is enabled.

At block 415, the firmware configures the switch using the values in the registers set at block 410. For example, if the register for the on-chip memory 230 in FIG. 2 indicates it is in the cache coherent domain/mode, the firmware configures the switch 225 so, when responding to read requests, it forwards the data received from the memory 230 to the cache coherent path 215 in the interconnect. Conversely, if the register for the on-chip memory 230 indicates it is in the I/O domain/mode, the firmware configures the switch 225 so it forwards data received from the memory 230 to the I/O path 220 in the interconnect when responding to the read requests. This process is reversed for write requests where data flows from the processor core to the memory.

At block 420, the firmware configures the interconnect so that data received from the processor or PL cores are routed on the correct path. For example, if the assignable memory is in the cache coherent domain, the firmware configures the interconnect so that data received from the cores with a memory address corresponding to the assignable memory is routed using the cache coherent path. By configuring the switch and the interconnect, the firmware ensures that data received from the cores and the assignable memories are routed on the corresponding paths, thereby following the appropriate protocols associated with those paths—e.g., strict read and write ordering as the case with the cache coherent domain, or use of a device driver as the case with the I/O domain.

At block 425, the firmware informs the OS in the processor core in the processor system of the assignments. If the processor system has multiple cores, with multiple embedded OSs, the firmware may inform each OS. In one embodiment, the IC containing the processor system may be connected to a host computing system using, e.g., a PCIe connection, which may have its own processor and OS. The host computing system does not need to be informed of the assignments made to the memories in the processor system. Stated differently, the method 400 can be completely transparent to any computing system that is external to, but communicates with, the IC.

Anytime the user changes her selection regarding the assignable memory, the method 400 can repeat. For example, the user may determine a memory initially assigned to the I/O domain may perform better if assigned to the cache coherent domain which provides a more suitable environment for parallel processing. Conversely, a memory initially assigned to the cache coherent domain may have a simpler software interface if assigned to the I/O domain which has stronger ordering requirements. However, changing the assignments of the assignable memories may require the IC to be re-booted before it can take effect.

Figure 5:
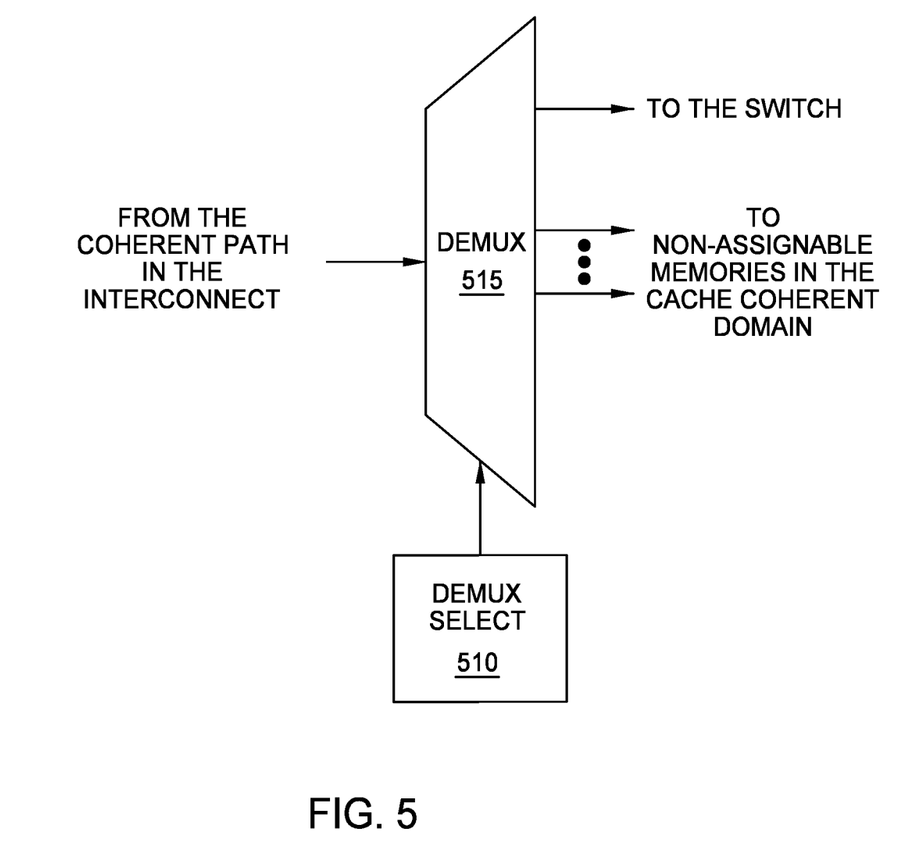
FIG. 5 illustrates a circuit for connecting both assignable and non-assignable memories to cache coherent path, according to an example.

FIG. 5 illustrates a circuit for connecting both assignable and non-assignable memories to a cache coherent path, according to an example. FIG. 5 illustrates receiving data from the cache coherent path 215 in the interconnect 210. This data can include addresses for memories that are assigned to the cache coherent domain. The address mask circuit 505 and a demux select circuit 510 perform a demux select function to steer memory accesses to the appropriate memories. That is, the demux select circuit 510 outputs a select signal to a demultiplexer (DEMUX) 515 which routes the data to the appropriate memory.

In this example, a first output of the DEMUX 515 is connected to an input of the switch 225 while the remaining outputs are connected to non-assignable memories in the cache coherent domain. As already shown in FIGS. 2 and 3, the assignable memories (e.g., the on-chip memory 230, the PL memory 310, and the accelerator memory 240) are connected to the switch 225. Thus, when forwarding data designated to the assignable memories, the DEMUX 515 first routes the data to the switch 225. Thus, the assignable memories are part of one common logical destination that routes through the switch 225. In contrast, the non-assignable memories do not have to be connected to the switch 225 since they are permanently assigned to the cache coherent domain, and thus, will always use the cache coherent path in the interconnect to communicate with the processor or PL cores. Unlike the assignable memories, the non-assignable memories are assigned individual destinations in the cache coherent path.

Thus, FIG. 5 illustrates circuitry that can be disposed between the cache coherent path in the interconnect and the switch which can be used to support non-assignable memories in the cache coherent domain. If the processor system did not have non-assignable memories in this domain, then the circuit in FIG. 5 could be omitted and the output of the cache coherent path could be directly connected to the switch 225.

Figure 6:
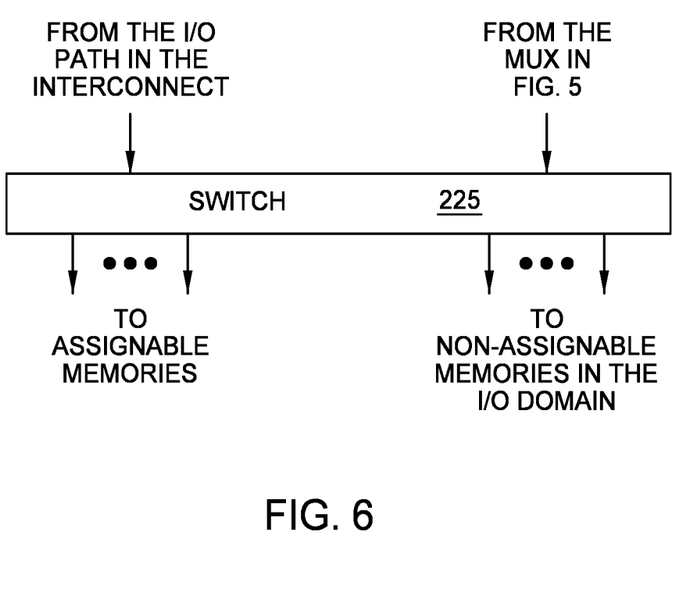
FIG. 6 illustrates a circuit for connecting both assignable and non-assignable memories to an I/O path, according to an example.

FIG. 6 illustrates a circuit for connecting both assignable and non-assignable memories to an I/O path, according to an example.

As shown, the switch 225 includes a first input used to receive data from the I/O path 220 in the interconnect 210 in FIGS. 2 and 3 and a second input used to receive the cache coherent data from the DEMUX 515 in FIG. 5. That is, the two inputs of the switch 225 merge the data transmitted on the I/O path and the cache coherent path for the assignable memories, regardless of which particular domain they are currently assigned.

Moreover, the switch 225 also supports routing data to non-assignable memories in the I/O domain. That is, the switch 225 can receive from the I/O path data destined for both the assignable memories and the non-assignable memories assigned to the I/O domain. Thus, data received from the I/O path may be destined to either an assignable memory or a non-assignable memory. However, data received from the DEMUX 515 in FIG. 5 is destined for only an assignable memory, since the DEMUX 515 routes data destined for non-assignable memories in the cache coherent domain on separate outputs. Thus, in this embodiment, cache coherent data destined to non-assignable memories does not reach the switch 225. However, in an alternative embodiment the configuration shown in FIGS. 5 and 6 could be reversed where the DEMUX 515 routes data destined for non-assignable memories in the I/O domain on separate outputs while forwarding data for assignable memories in the I/O domain to the switch 225. In that case, the I/O data destined to non-assignable memories does not reach the switch 225 while the cache coherent data for both assignable and non-assignable memories is routed through the switch 225.

Regardless whether the data is cache coherent or MMIO, the switch 225 can evaluate the address data to determine its destination—i.e., route cache coherent data to one of the assignable memories, route MMIO data to one of the assignable memories, or route MMIO data to one of the non-assignable memories.

For simplicity, FIG. 6 shows data flowing from the cores to the assignable and non-assignable memories. However, the process described above can be reversed when data flows from the assignable and non-assignable memories to the cores via the interconnect. For example, if an assignable memory transmits data to the switch 225, the switch 225 determines whether the assignable memory is part of the cache coherent or I/O domain. If the cache coherent domain, the switch 225 can use a first output to route the data to the cache coherent path of the interconnect. If the I/O domain, the switch 225 can use a second output to route the data to the I/O path of the interconnect. In contrast, the switch 225 knows that any data received from a non-assignable memory should be output to the I/O path since, in this example, the switch 225 is only coupled to non-assignable memories in the I/O domain. The non-assignable memories assigned to the cache coherent domain may have direct connections to the cache coherent path of the interconnect, and thus, completely bypass the switch 225.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A processor system in an integrated circuit (IC), comprising:
    an interconnect comprising a cache coherent path and an input/output (I/O) path;
    a processor core connected to the interconnect;
    a switch connected to the cache coherent path and the I/O path;
    assignable memories configured to be assigned to one of a cache coherent domain shared with the processor core or an I/O domain which is non-cache coherent with the processor core, wherein the switch routes data between the assignable memories and the cache coherent and I/O paths depending on an assignment to the cache coherent and I/O domains; and
    non-assignable memories that are statically assigned to one of the cache coherent domain or the I/O domain, wherein one of:
        a first number of the non-assignable memories is assigned to the cache coherent domain and bypasses the switch when communicating with the interconnect and the processor core, and a second number of the non-assignable memories is assigned to the I/O domain and uses the switch to communicate with the interconnect and the processor core, or
        the first number of the non-assignable memories is assigned to the I/O domain and bypasses the switch when communicating with the interconnect and the processor core, and the second number of the non-assignable memories is assigned to the cache coherent domain and uses the switch to communicate with the interconnect and the processor core.

2. The processor system of claim 1, wherein the assignable memories are configurable to be switched between being assigned to the cache coherent domain and the I/O domain.

3. The processor system of claim 1, further comprising:
an accelerator comprising (i) an offload accelerator circuit configured to perform tasks assigned by the processor core and (ii) one of the assignable memories.

4. The processor system of claim 1, further comprising:
a programmable logic (PL) core assigned to the cache coherent domain with the processor core,
wherein one of the assignable memories is a PL memory.

5. The processor system of claim 1, wherein the switch is configured to forward data received from a first assignable memory of the assignable memories assigned to the cache coherent domain to the cache coherent path and data received from a second assignable memory of the assignable memories assigned to the I/O domain to the I/O path.

6. The processor system of claim 1, wherein the interconnect comprises a Coherent Mesh Network (CMN), and wherein the processor core, CMN, switch, assignable memories, and non-assignable memories are in the processor system of the IC.

7. A method comprising:
assigning memories in a processor system to one of a cache coherent domain or an I/O domain;
configuring a switch based on the assignment, wherein the switch is communicatively coupled between the memories and an interconnect;
configuring the interconnect based on the assignment, wherein the interconnect is communicatively coupled between the switch and a processor core that is in the cache coherent domain;
informing an operating system in the processor core of the assignment;
performing a new assignment where at least one of the memories is switched to a different domain; and
updating the switch, interconnect, and the operating system in response to the new assignment.

8. The method claim 7, further comprising:
receiving a user selection indicating the assignment of the memories to one of the cache coherent domain or the I/O domain.

9. The method of claim 7, wherein configuring the switch comprises:
indicating to the switch to forward data received from a first number of the memories assigned to the cache coherent domain to a cache coherent path in the interconnect; and
indicating to the switch to forward data received from a second number of the memories assigned to the I/O domain to an I/O path in the interconnect.

10. The method of claim 9, wherein configuring the interconnect comprises:
indicating to the interconnect that memory addresses corresponding to the first number of the memories correspond to the cache coherent path; and
indicating to the interconnect that memory addresses corresponding to the second number of the memories correspond to the I/O path.

11. The method of claim 7, further comprising:
transmitting data, using the interconnect, between non-assignable memories and the processor core, wherein the non-assignable memories are statically assigned to one of the cache coherent domain or the I/O domain and bypass the switch.

12. The method of claim 7, wherein the interconnect comprises a Coherent Mesh Network (CMN), and wherein the processor core, CMN, switch, and memories are in the processor system.

13. An integrated circuit (IC), comprising:
a processor system comprising:
an interconnect comprising a cache coherent path and an input/output (I/O) path;
a processor core connected to the interconnect;
a switch connected to the cache coherent path and the I/O path;
assignable memories configured to be assigned to one of a cache coherent domain shared with the processor core or an I/O domain which is non-cache coherent with the processor core, wherein the switch routes data between the assignable memories and the cache coherent and I/O paths depending on an assignment to the cache coherent and I/O domains; and
non-assignable memories that are statically assigned to one of the cache coherent domain or the I/O domain, wherein one of:
a first number of the non-assignable memories is assigned to the cache coherent domain and bypasses the switch when communicating with the interconnect and the processor core, and a second number of the non-assignable memories is assigned to the I/O domain and uses the switch to communicate with the interconnect and the processor core, or
the first number of the non-assignable memories is assigned to the I/O domain and bypasses the switch when communicating with the interconnect and the processor core, and the second number of the non-assignable memories is assigned to the cache coherent domain and uses the switch to communicate with the interconnect and the processor core.

14. The IC of claim 13, further comprising:
a network on a chip (NoC) coupled to the processor system; and
a data processing engine array coupled to the NoC.

15. The IC of claim 13, wherein the assignable memories are configurable to be switched between being assigned to the cache coherent domain and the I/O domain.

16. The IC of claim 15, wherein the processor core is statically assigned to the cache coherent domain.

17. The IC of claim 13, wherein the processor system further comprises:
an accelerator comprising (i) an offload accelerator circuit configured to perform tasks assigned by the processor core and (ii) one of the assignable memories.

18. The IC of claim 13, wherein the processor system further comprises:
a programmable logic (PL) core assigned to the cache coherent domain with the processor core,
wherein one of the assignable memories is a PL memory.

19. The IC of claim 13, wherein the switch is configured to forward data received from a first assignable memory of the assignable memories assigned to the cache coherent domain to the cache coherent path and data received from a second assignable memory of the assignable memories assigned to the I/O domain to the I/O path.

20. The IC of claim 13, wherein the interconnect comprises a Coherent Mesh Network (CMN), and wherein the processor core, CMN, switch, assignable memories, and non-assignable memories are in the processor system of the IC.

\* \* \* \* \*